(12) United States Patent
Emam et al.

(10) Patent No.: US 6,738,741 B2
(45) Date of Patent: May 18, 2004

(54) SEGMENTATION TECHNIQUE INCREASING THE ACTIVE VOCABULARY OF SPEECH RECOGNIZERS

(75) Inventors: Ossama Emam, Giza (EG); Siegfried Kunzmann, Heidelberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/298,494

(22) Filed: Nov. 18, 2002

(65) Prior Publication Data

US 2003/0078778 A1 Apr. 24, 2003

Related U.S. Application Data

(63) Continuation of application No. 09/382,743, filed on Aug. 25, 1999, now abandoned.

(30) Foreign Application Priority Data

Aug. 28, 1998 (EP) ............................................. 98116278

(51) Int. Cl.[7] .......................... G10L 15/04; G06F 17/20
(52) U.S. Cl. ....................................... 704/251; 704/254
(58) Field of Search ................................. 704/231, 240, 704/251, 252, 254, 255, 257, 9

(56) References Cited

U.S. PATENT DOCUMENTS

| | | | | | |
|---|---|---|---|---|---|
| 5,283,833 A | * | 2/1994 | Church et al. | ............... | 704/252 |
| 5,832,428 A | * | 11/1998 | Chow et al. | ................. | 704/254 |
| 5,835,888 A | * | 11/1998 | Kanevsky et al. | .............. | 704/9 |
| 6,073,091 A | * | 6/2000 | Kanevsky et al. | .............. | 704/9 |
| 6,138,087 A | * | 10/2000 | Budzinski | ....................... | 704/9 |
| 6,192,337 B1 | * | 2/2001 | Ittycheriah et al. | .......... | 704/231 |
| 6,308,149 B1 | * | 10/2001 | Gaussier et al. | ............... | 704/9 |
| 6,405,161 B1 | * | 6/2002 | Goldsmith | ...................... | 704/9 |
| 6,507,678 B2 | * | 1/2003 | Yahagi | ........................ | 382/305 |

OTHER PUBLICATIONS

P. Geutner, "Using Morphology Towards Better Large–Vocabulary Speech Recognition Systems,"IEEE, pp. 445–448, May 9, 1995.

* cited by examiner

*Primary Examiner*—Richemond Dorvil
*Assistant Examiner*—Martin Lerner
(74) *Attorney, Agent, or Firm*—Thu Ann Dang

(57) ABSTRACT

A speech recognition system and a method executed by a speech recognition system focusing on the vocabulary of the speech recognition system and its usage during the speech recognition process is provided. A segmented vocabulary and its exploitation is provided comprising a multitude of entries wherein an entry is either identical to a legal word or a constituent of a legal word of the language, and the constituent is an arbitrary sub-component of the legal word according to the orthography. A constituent can comprise any number of characters not limited to a syllable of a legal word or a recognition unit of the speech recognition system. The vocabulary is used to recognize constituents of the vocabulary for recombination of the constituents into legal words if a constituent combination table indicates that the recognized constituents are a legal concatenation in the language.

19 Claims, 5 Drawing Sheets

Word = Prefix Core Suffix

SPLIT-TABLE: 3 PIECES

Word = Prefix Core

SPLIT-TABLE: 2 PIECES

FIG. 4

| at | Prefix | Core | Suffix | Word |
|---|---|---|---|---|
| 1 | - | at | - | at |
| 2 | c | at | - | cat |
| 3 | m | at | - | mat |
| 4 | h | at | - | hat |
| 5 | c | at | s | cats |
| 6 | m | at | s | mats |
| 7 | h | at | s | hats |

| all | Prefix | Core | Suffix | Word |
|---|---|---|---|---|
| 1 | - | all | - | all |
| 2 | c | all | - | call |
| 3 | m | all | - | mall |
| 4 | h | all | - | hall |
| 5 | c | all | s | calls |
| 6 | m | all | s | malls |
| 7 | h | all | s | halls |

| work | Prefix | Core | Suffix | Word |
|---|---|---|---|---|
| 1 | - | work | - | work |
| 2 | - | work | s | works |
| 3 | - | work | ed | worked |
| 4 | - | work | er | worker |
| 5 | - | work | ers | workers |
| 6 | - | work | ing | working |

| use | Prefix | Core | Suffix | Word |
|---|---|---|---|---|
| 1 | - | use | - | use |
| 2 | - | use | s | uses |
| 3 | - | use | ed | used |

FIG. 6

SPEECH INPUT →

- ACOUSTIC PROCESSOR
- FAST MATCH ← VOCABULARY
- DETAILED MATCH
- STACK DECODER ← LM STATISTICS

↓ DECODED TEXT

606 — TEXT POST PROCESSING ← CONCATENATION MATRICES

↓ POSTPROCESSED, DECODED TEXT

FIG. 7

CONCATENATION MATRICES

CORE-PREFIX MATRIX

|     | 001 | 002 | 003 | 004 | ○ | ○ | ○ | 100 |
|-----|-----|-----|-----|-----|---|---|---|-----|
| 000 | 1   | 1   | 1   | 1   | ○ | ○ | ○ | 0   |
| 001 | 1   | 0   | 1   | 0   | ○ | ○ |   | ○   |
| 002 | ○   | ○   | ○   |     |   |   |   | ○   |
| 003 | ○   | ○   |     |     |   |   |   | ○   |
| ⋮   |     |     |     |     |   |   |   |     |
| 380 |     |     |     |     |   |   |   |     |

PREFIX-PREFIX MATRIX

|     | 001 | 002 | 003 | 004 | ○ | ○ | ○ | 100 |
|-----|-----|-----|-----|-----|---|---|---|-----|
| 000 | 1   | 0   | 1   | ○   | ○ | ○ | ○ | 0   |
| 001 | 1   | 1   | 0   | ○   | ○ | ○ |   | ○   |
| 002 | ○   | ○   | ○   |     |   |   |   | ○   |
| 003 | ○   | ○   |     |     |   |   |   | ○   |
| 004 | ○   |     |     |     |   |   |   |     |
| ⋮   |     |     |     |     |   |   |   |     |
| 100 |     |     |     |     |   |   |   |     |

SEGMENTATION TECHNIQUE INCREASING THE ACTIVE VOCABULARY OF SPEECH RECOGNIZERS

CROSS-REFERENCE TO RELATED APPLICATIONS

This application is a continuation of pending U.S. application Ser. No. 09/382,743, filed Aug. 25, 1999, now abandoned which is incorporated by reference herein.

1 BACKGROUND OF THE INVENTION

1.1 Field of the Invention

The present invention relates to a speech recognition system and a method executed by a speech recognition system. More particularly, the invention relates to the vocabulary of a speech recognition system and its usage during the speech recognition process.

1.2 Description and Disadvantages of Prior Art

The invention may preferably be implemented in accordance with the IBM ViaVoice 98 speech recognition system developed by the present assignee. IBM ViaVoice 98 is a real time speech recognition system for large vocabularies which can be speaker-trained with little cost to the user. However, the invention is not limited to use with this particular system and may be used in accordance with other speech recognition systems.

The starting point in these known systems is the breakdown of the speech recognition process into a part based on acoustic data (decoding) and a language statistics part referring back to bodies of language or text for a specific area of application (language model). The decision on candidate words is thus derived both from a decoder and a model language probability. For the user, the fitting of the vocabulary processed by this recognition system, to the specific field or even to individual requirements, is of particular significance.

With this speech recognition system, the acoustic decoding first supplies hypothetical words. The further evaluation of competing hypothetical words is then based on the language model. This represents estimates of word string frequencies obtained from application-specific bodies of text based on a collection of text samples from a desired field of application. From these text samples are generated the most frequent forms of words and statistics on word sequences.

In the method used here for estimating the frequency of sequences of words, the frequency of occurrence of the so-called word form trigrams in a given text are estimated. In known speech recognition systems, the so-called Hidden Markov Model is frequently used for estimating the probabilities. Here, several frequencies observed in the text are set down. For a trigram "uvw" these are a nullgram term $f_0$, a unigram term $f(w)$, a bigram term $f(w|v)$ and a trigram term $f(w|uv)$. These terms correspond to the relative frequencies observed in the text, where the nullgram term has only a corrective significance.

If these terms are interpreted as probabilities of the word w under various conditions, a so-called latent variable can be added, from which one of the four conditions which produce the word w is achieved by substitution. If the transfer probabilities for the corresponding term are designated $\lambda_0$ $\lambda_1$ $\lambda_2$ $\lambda_3$, then we obtain the following expression for the trigram probability sought $$Pr(w|uv) = \lambda_0 f_0 + \lambda_1 f(w) + \lambda_2 f(w|v) + \lambda_3 f(w|uv)$$

The known speech recognition systems have the disadvantage that each word appears as a word form in the vocabulary of the system. For this reason there are relatively large demands on the memory capacity of the system. The generally very extensive vocabularies also have a disadvantageous effect on the speed of the recognition process.

Typical speech recognition systems are working in real-time on today's PCs. They have an active vocabulary of up to and exceeding 60,000 words, can recognize continuously and/or naturally spoken input without the need to adapt the system to specific characteristics of a speaker. S. Kunzmann; "VoiceType: A Multi-Lingual, Large Vocabulary Speech Recognition System for a PC", Proceedings of the 2nd SQEL Workshop, Pilsen, Apr. 27–29, 1997, ISBN 80-7082-314-3) gives an outline on these aspects. Given the actual vocabulary used in human communication, the order of magnitude of the vocabulary recognized by computer-based speech recognition systems must actually reach hundreds of thousands to several million words. Even if such large vocabulary sizes would be available today, beside algorithmic limitations on recognizing these extremely large vocabulary sizes, issues like recognition accuracy, decoding speed and system resources (CPU, memory, disc) play a major role for classifying real-time speech recognition systems.

In the past several approaches have been suggested to increase the size of the active vocabulary for such recognition systems. In particular such state of the art approaches are related to the handling of compound words.

The German patent for instance DE 19510083 C2 assumes that the compound words e.g., German "Fahrbahnschalter" or "vorgehen" are decomposed in constituents like "Fahrbahn-schalter" or "vor-gehen". The assumption is that composita are split in constituents which are a sequences of legal words in the German language as well as in the recognition vocabulary ("Fahrbahn", "Schalter" and "vor", "gehen"). For each of these words statistics are computed, describing the most likely frequencies of each word (Fahrbahnschalter, vorgehen) in their context of occurrence e.g., "Der Fahrbahnschalter ist geschlossen". In addition separate frequency statistics are computed which describe the sequence of these constituents within compound words. Both statistical models are used to decide if the individual constituents are displayed to the user as single words or as compound word. Cases like "Verfügbarkeit" (constituents: "verfügbar"+"keit") or "Birnen" (constituents: "Birne"+"n") are not covered since "keit" and "n" are neither legal (standalone) words nor syllables in the German language, thus it's not contained within the recognition vocabulary. According to this teaching an additional, separate frequency model is required to allow the resolving of problems of illegal word sequences during recombination of these arbitrary constituents into words (e.g. "vor"–"Verfügbar").

The recent U.S. patent U.S. Pat. No. 5,754,972 teaches the introduction of a special dictation mode where the user either announces a "compound dictation mode" or the system is switched into a special recognition mode. This is exposed to the user by a specific user interface. In languages like German the occurrence of compound words is extremely frequent, so the need to switch towards specific dictation modes is extremely cumbersome. In addition, the teaching of U.S. Pat. No. 5,754,972 is based on the same fundamental assumption as German patent DE 19510083 C2: compound words can be built only on constituents representing legal words of the vocabulary by their own. To support the generation of new compound words the spelling of the characters of the compound word is introduced within this special dictation mode.

A different approach is disclosed by G. Ruske, "Half words as processing units in automatic speech recognition", Journal "Sprache und Datenverarbeitung", Vol. 8, 1984, Part ½, pp. 5–16. A word of the recognition vocabulary is usually described via it's orthography (spelling) and it's associated (multiple) pronunciations via smallest recognition units. The recognition units are the smallest recognizable units for the decoder. G. Ruske defines these recognition units based on a set of syllables (around 5000 in German). To each spelling of the vocabulary, a sequence of syllables describes the pronunciation(s) of each individual word. Thus, according to the teaching of Ruske, words of the vocabulary are set up by the recognition units of the decoder being identical to the syllables according to the pronunciation of the word in that language. Therefore, the recombination of constituents to build words of the language is thus limited to the recognition units of the decoder.

1.3 Objective of the Invention

The invention is based on the objective to provide a technology to increase the size of an active vocabulary recognized by speech recognition systems. It is a further objective of the current invention to reduce at the same time the algorithmic limitations on recognizing such extremely large vocabulary sizes for instance in terms of recognition accuracy, decoding speed and system resources (CPU, memory, disc), and thus to play a major role in classifying real-time speech recognition systems.

2 SUMMARY AND ADVANTAGES OF THE INVENTION

These and other objectives are achieved by a speech recognition system according to the present invention. The invention teaches a speech recognition system for recognition of spoken speech of a language comprising a segmented vocabulary. The vocabulary includes a multitude of entries. An entry can be either identical to a legal word of said language, or an entry can be a constituent of a legal word of said language. A constituent can be an arbitrary sub-component of said legal word according to the orthography. The constituent is not limited to a syllable of said legal word or to a recognition unit of said speech recognition system.

The technique proposed by the current invention allows for a significant compression of a vocabulary. The invention allows to define and store N words but generate and recognize up to M×N words (where M is language dependent) as combinations of the vocabulary entries.

Smaller vocabularies allow in addition a better estimation of the word (or piece) probabilities (uni-, bi-, tri-grams within their context environment as more occurrences are seen in the respective corpora.

Efficient storing is achieved via mapping the N words into a set of groups having the same pattern of constituents. Such an approach ensures logical completeness and coverage of the chosen vocabulary. Usually the user who dictates a word defined in the vocabulary expects that all derived forms are also available. For example, one doesn't expect that the word 'use' is in the vocabulary while 'user' is not.

Complete flexibility (as with the current teaching) in defining the constituent sets for each language makes it possible to achieve the best compression. The constituents are not necessarily a linguistic or phonetic known unit of the language.

Additional advantages are accomplished by said vocabulary defining legal words of said language recognizable by said speech recognition system either by an entry itself or by recombination of up to S entries in combination representing a legal word of said language. The invention preferably suggests S being the number 2 or 3.

As any number of constituents can be used for recombination of legal words, the compression rate of such a segmented vocabulary can be very large. On the other hand, the compression rate and the algorithmic complexity for recombination are antagonistic properties of the proposed speech recognition system. To limit the number of segments to recombine constituents into legal words to S=2 or S=3 is an effective compromise.

According to a further embodiment of the proposed invention the speech recognition system, if based on a segmented vocabulary, comprises, if S is 2, constituents allowing for recombination of legal words from a prefix-constituent and a core-constituent, or from a core-constituent and a suffix-constituent, or from a prefix-constituent and a suffix-constituent. In addition said vocabulary comprises, if S is 3, constituents allowing for recombination of legal words from a prefix-constituent, a core-constituent and a suffix-constituent.

By distinguishing different types of constituents, properties of the individual languages can be reflected since typically not every constituent type can be recombined with any other constituent type. This approach simplifies the recognition process and eases the determination of recognition errors.

According to a further embodiment of the proposed invention, a constituent combination table is taught. It indicates which concatenations of said constituents are legal concatenations in said language.

Such constituent combination tables are performance and storage efficient means to define which constituent may be recombined with other constituents resulting in a legal constituent or legal word of said language.

According to a further embodiment of the proposed invention, said constituent combination table comprises in the case of S=2 or S=3, a core-prefix-matrix indicating whether a combination of a prefix-constituent and a core-constituent is a legal combination in said language or not; and/or a prefix-suffix-matrix indicating whether a combination of a prefix-constituent and a suffix-constituent is a legal combination in said language or not; and/or a prefix-prefix-matrix indicating whether a combination of a first-prefix-constituent and a second-prefix-constituent is a legal combination in said language building a third-prefix constituent or not; and/or a core-suffix-matrix indicating whether a combination of a core-constituent and a suffix-constituent is a legal combination in said language or not.

The approach to reduce the question of legal recombinations to a sequence of decisions involving only two constituents reduces computation effort. Moreover, introduction of a collection of constituent combination tables depending on the types of constituents to be recombined increases efficiency of the recombination process. Depending on the type of constituents for certain cases, no legal combination is possible and thus no table access has to be performed. Also, in terms of access and storage requirements, it is more efficient to exploit a larger number of smaller tables than only a few larger tables.

According to a further embodiment of the proposed invention, said core-prefix-matrix and/or said core-suffix-matrix and/or said prefix-suffix-matrix and/or said prefix-prefix-matrix have a structure wherein said core-constituents, said prefix-constituents and said suffix-constituents are represented by unique numbers which form the indexes of said matrixes.

By encoding the various constituents as unique numbers and by setting up the various constituent combination tables based on these numbers, the complete recombination and recognition process is accelerated as no translations between constituents and their encodings are required anymore.

According to a further embodiment of the proposed invention, a separate post-processor is suggested responsive to an input comprising recognized constituents of said vocabulary. Said post-processor recombines said constituents into legal words of said language exploiting said constituent combination table.

Implementing the recombination of constituents into a separate post-processor has the advantage that the teaching of the current invention can be applied to any existing speech recognition system without further modification or enhancements. If recombination is done in a post-processor, the statistic correlation information of the language model has been exploited already when the post-processor becomes active. Thus, the reliability of the recognized constituents is already high when inputted to the post-processor and will be increased further by said post-processing.

A further embodiment of the proposed invention relates to details of the recombination. Several cases can be distinguished.

Said post-processor is responsive to two consecutive constituents representing a first prefix-constituent and a second prefix-constituent and recombines said first prefix-constituent and said second prefix-constituent into a third prefix-constituent if said prefix-prefix-matrix is indicating said first prefix-constituent and said second prefix-constituent as a legal combination in said language. If said prefix-prefix-matrix indicates said first prefix-constituent and said second prefix-constituent as an illegal combination in said language, said first prefix-constituent is dropped.

Said post-processor is responsive to two consecutive constituents representing a prefix-constituent and a core-constituent and recombines said prefix-constituent and said core-constituent into a second core-constituent if said core-prefix-matrix is indicating said prefix-constituent and said core-constituent as a legal combination in said language. If said core-prefix-matrix indicates said prefix-constituent and said core-constituent as an illegal combination in said language, it replaces said prefix-constituent with an alternative prefix-constituent and recombines said alternative prefix-constituent and said core-constituent if said core-prefix-matrix is indicating said alternative prefix-constituent and said core-constituent as a legal combination in said language.

Said post-processor is responsive to two consecutive constituents representing a prefix-constituent and a suffix-constituent and recombines said prefix-constituent and said suffix-constituent into a second prefix-constituent if said prefix-suffix-matrix is indicating said prefix-constituent and said suffix-constituent as a legal combination in said language.

Said post-processor is responsive to two consecutive constituents representing a core-constituent and a suffix-constituent and recombines said core-constituent and said suffix-constituent into a second core-constituent if said core-suffix-matrix is indicating said core-constituent and said suffix-constituent as a legal combination in said language.

Besides recombining constituents, these features offer the advantages of detecting and also in a certain extent of correcting recognition errors.

According to a further embodiment of the proposed invention, said prefix-constituent and said suffix-constituent are not recombined and said prefix-constituent is treated as a separate entry if said prefix-suffix-matrix is indicating said prefix-constituent and said suffix-constituent as an illegal combination in said language. Moreover, said core-constituent and said suffix-constituent are not recombined and said core-constituent is treated as a separate entry if said core-suffix-matrix is indicating said core-constituent and said suffix-constituent as an illegal combination in said language.

This invention feature allows for determination of word boundaries.

According to a further embodiment of the proposed invention, said alternative prefix-constituent is retrieved from an alternative-list comprising alternative prefix-constituents to said prefix-constituents in decreasing matching probability.

Such an approach further increases recognition accuracy.

The objectives stated above are also achieved by the method of the invention. Further embodiments of the proposed invention are provided herein.

For the feature details it is referred to the claims. The features are in tight correspondence to the device claims. As far as the advantages are concerned, above statements relating to the claimed device are also applicable.

3 BRIEF DESCRIPTION OF THE DRAWINGS

FIG. 1 is a diagram reflecting the structure of the split-tables according to the current invention, modeling how legal words of a language are decomposed into constituents which then become part of the segmented vocabulary.

FIG. 2 visualizes the steps according to the state of the art teaching to compute a language model (LM) for the speech recognizer.

FIG. 3 visualizes the steps according the current invention to compute a language model (LM) for the speech recognizer based on the segmented vocabulary.

FIG. 4 visualizes by example how a small segmented vocabulary allows to support the recognition of a rich set of legal words of a language by recombination of constituents.

FIG. 6 is a block diagram reflecting the structure of a decoder of a speech recognizer according to the current teaching visualizing the new post-processor.

FIG. 7 visualizes two examples of constituent combination tables, a core-prefix-matrix and a prefix-prefix-matrix.

Figure 8:
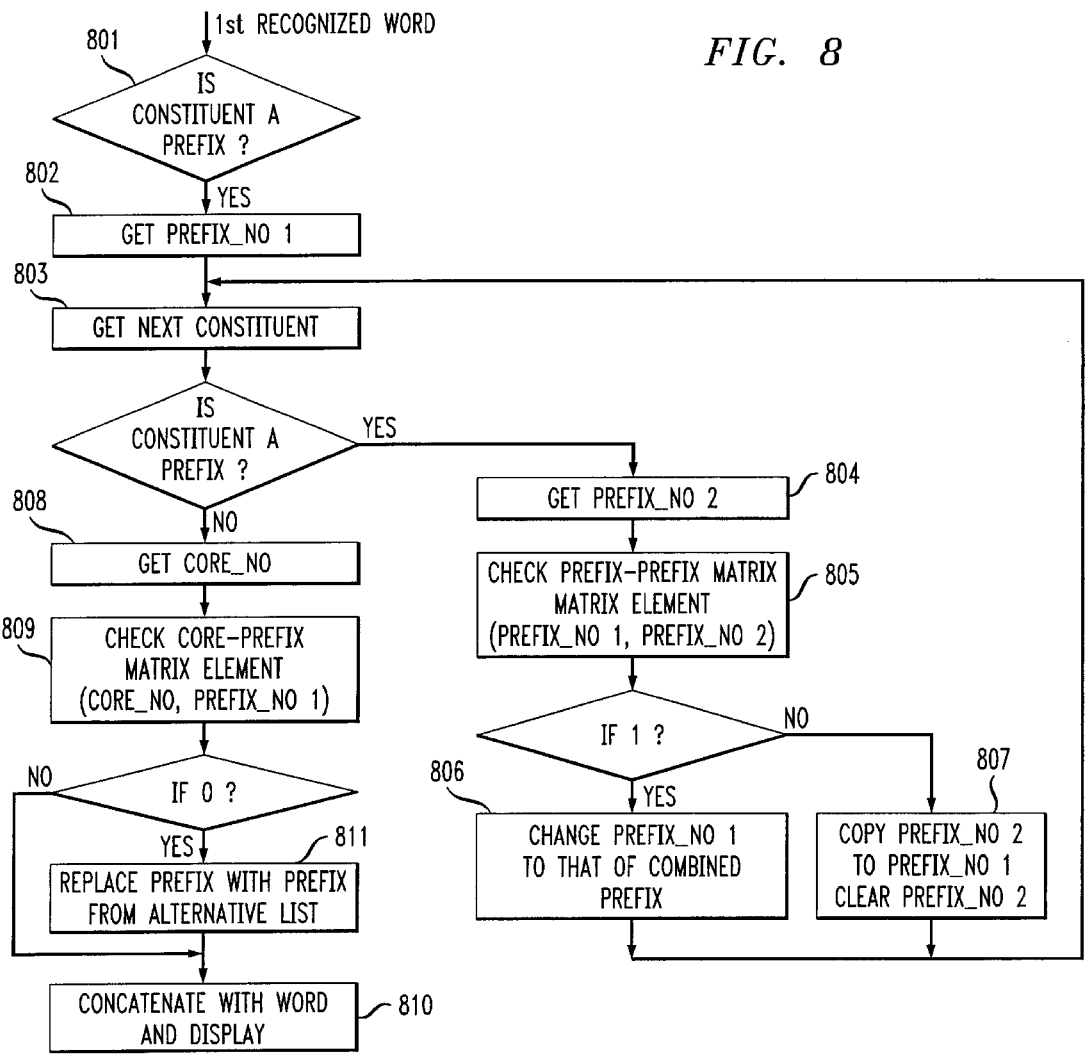

FIG. 8 depicts in form of a flow-diagram the exploitation of the core-prefix-matrix and the prefix-prefix-matrix during the execution of the post-processor.

4 DESCRIPTION OF THE PREFERRED EMBODIMENT

If the current specification is referring to a certain natural language for outlining certain inventive features, this has to be understood as an example only. The inventive technology itself is applicable to any type of natural language.

The current specification is based on the IBM ViaVoice 98 speech recognition system. The invention is not limited to this specific speech recognition system, it applies to other speech recognition systems as well.

4.1 Introduction

A Speech Recognizer is a device which automatically transcribes speech into text. It can be thought of as a voice activated "typewriter" in which, the transcription is carried out by a computer program and the transcribed text appears on a workstation display.

For the purpose of this invention, the designation "word" denotes a word form defined by its spelling. Two differently spelled inflections or derivations of the same stem are considered different words (example: work, works, workers, . . . ). Homographs having different parts of speech or meaning constitute the same word.

The list of words that are chosen for a dictation task is called "vocabulary." It is finite, pre-defined and constitutes the words that can be "printed" out by the speech recognizer.

For each word (according to the spelling) in the vocabulary, there is a phonetic description of the way(s) this word could be uttered; this is called the "pronunciation" of that word. One word (according to its spelling) can have more than one pronunciation.

A "Language Model" (LM) is a conceptual device which, given a string of past words, provides an estimate of the probability that any given word from an allowed vocabulary will follow the string i.e., $P(W_k/W_{k-1}, \ldots W_1)$. In speech recognition, a LM is used to direct the hypothesis search for the sentence that was spoken. For reasons of estimation as well as estimate storage, past strings which the prediction is based on, are partitioned into a manageable number of n words. In a 3-gram LM, the prediction of a word depends on the past two words. The probability is derived from the uni-grams, bi-grams, and tri-grams counts according to the following mathematical formula, $$P(w_3/w_1 w_2) = h_3 \frac{C_{123}}{C_{12}} + h_2 \frac{C_{23}}{C_2} + h_1 \frac{C_3}{N} + h_0$$

where $C_x$, counts of word x, $C_{xy}$ counts of occurrence of word x followed by word y, $C_{xyz}$ counts of occurrence of the sequence word x y z, $h_x$ are weighting factors to combine the context information probabilities.

The training "corpus" is the text data coming from various sources to be used in counting the statistics to build the LM.

4.2 The Solution

The following invention relates to the recognition of spoken speech and solves problems relative to limited vocabulary size defined/known to speech recognition systems.

The current invention is based on the fundamental idea to increase the size of recognizable words stored within the vocabulary not by the straightforward approach of just storing further complete legal words of the language and thus increasing the vocabulary size. The invention instead suggests to create a vocabulary consisting of a mixture of complete legal words of the language and of constituents of legal words of the language. By providing constituent combination tables indicating which recombinations of the constituents form legal words of the language, the recognition process of the speech recognizer is able to identify an increased size of recognizable words of that language forming the active vocabulary. In the subsequent specification, methods are being described allowing to use arbitrary constituents within the active recognition vocabulary. The current teaching allows to form constituents from any number of characters; constituents even with one character only are possible. Constituents also are not limited to specific relations to the recognition units of the decoder. Constituents according to the current invention are denoted as prefix or suffix (e.g., suffix "n" to denote pluralization of nouns) or cores. In addition, the current invention does not require to compute an additional, separate frequency model to allow the resolving of problems of illegal word sequences during recombination of these arbitrary constituents into words (e.g., "vor"–"Verfügbar") thus saving quite some disk space and decoding overhead (minimizing alternate paths evaluation). The current teaching may be applied to segmentation and recombination of any number S of constituents. For efficiency reasons, using a smaller number of constituents, for example S=2 or S=3, turned out to be advantageous.

Figures 1, 2:
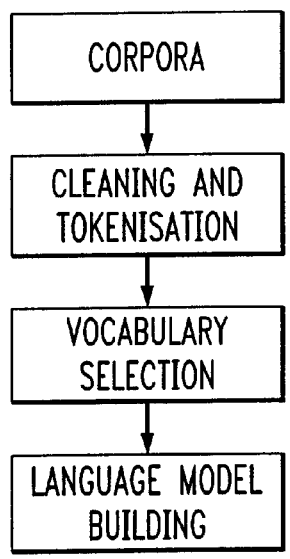

The following specification will refer to "prefix-core" segmentation as 2-pieces and to "prefix-core-suffix" segmentation as 3-pieces. FIG. 1 visualizes the structure of the "split-tables" showing how legal words in a language are split or recombined by constituents. The split-tables contain the word splitting information (either into 2 pieces or 3 or even more). How to obtain this table will be explained below.

Assume for a given language that a split table is obtained where the number of the original words (non-split) is much higher than the number of cores plus the set of prefixes and suffixes (pieces). The main idea then is to make use of this to define to the recognizer a vocabulary of pieces, recognize during run-time the pieces and display on the screen the original word after concatenating the pieces that constitute this word.

Moreover, the current invention does not expose to the user at any time the special handling of compound words and/or words preceded or followed but a set of prefixes/suffixes and specific dictation modi for compound word handling has to be introduced.

The current invention suggests to use phones as the smallest recognizable unit for the decoder process. Thus, each entry of the increased vocabulary is consisting of a spelling (which can be an arbitrary constituent) and associated phones to identify allowable pronunciations. On this background, if the current disclosure makes use of the term "syllables" it has to be understood as potential prefix or suffix of words (German: "vor", "keit", Arabic: "uuna") to imply a set of characters on orthographic level having associated a phone based pronunciation. Therefore, a syllable (in terms of orthography) according to the current invention is not limited to a syllable in terms of pronunciation. The Arabic suffix "uuna" (masculine, plural) is clearly consisting of 2 syllables (based on Ruske's definition of smallest recognition unit) but represented by 4 phones in the system according to this invention. The recombination of constituents to build words of the language is thus based on characters and not by means of recognition units.

As therefore the proposed technique essentially covers the preprocessing of large corpora (for setting up the new segmented type of vocabulary) and post-processing, i.e., recombination of constituents, these techniques can be applied to any existing decoder without further modifications or enhancements.

It has to be pointed out that the segmentation and recombination approach of the current invention is not used for the recognition of compound words (from other legal words) in clear distinction to other state of the art teaching; instead the invention allows for storage-efficient realization of vocabularies. The reduced size of segmented vocabularies on the other hand may then be used to again increase the vocabulary for increased recognition and coverage of the language.

4.2.1 Limitations of State of the Art Speech Recognition Systems

Current speech recognition systems can only handle up to 64 k (128 k in the very recent version of the IBM ViaVoice 98) pronunciations. This limitation is due to the numbers of bits provided by a certain processor architecture for addressing the storage contents. This means that if a given language has an average of two pronunciations per word, the number of words is often limited to a maximum of 32 k (64 k in ViaVoice 98) words.

Many languages are characterized by the use of "inflection"; one basic word form can generate several hundreds of word forms. For instance, a relatively small vocabulary of 35 k English words can represent more than 99% of the everyday spoken English. A different situation exists for inflected languages that use very large vocabularies. For example, the Russian language requires at least 400 k words to represent more than 99% of the everyday spoken Russian language and Arabic requires at least 200 k to represent 99% of the everyday spoken Arabic language. Thus, the size of vocabularies in these languages is very large. Such a large vocabulary cannot be used in current real-time speech recognizers for the limitations mentioned above.

In general, highly inflected languages, in addition to possessing a very rich morphology, are also highly combinatorial, in that several hundreds of words can be generated from one core preceded/followed by one or more prefixes/suffixes. Thus, one would expect to achieve a great deal of coverage on handling those language words as a combination of these pieces.

4.2.2 Building the Language Model

The traditional building processes of a language model (LM) are depicted in FIG. 2 and comprise the following steps:

1. Collecting corpora that represent the domain where the Speech Recognizer is to be used.
2. Cleaning (e.g., removing the tables and formatting information from the text) and tokenization (e.g., convert a sentence like "see you at 14:00." to "see you at 2 o'clock PM.").
3. Select the vocabulary by counting the frequency of occurrence of each word and choosing the top N (where N<=32 k) most frequently occurred words.
4. Build the LM by computing the 3-gram counts for those N words.

Figure 3:
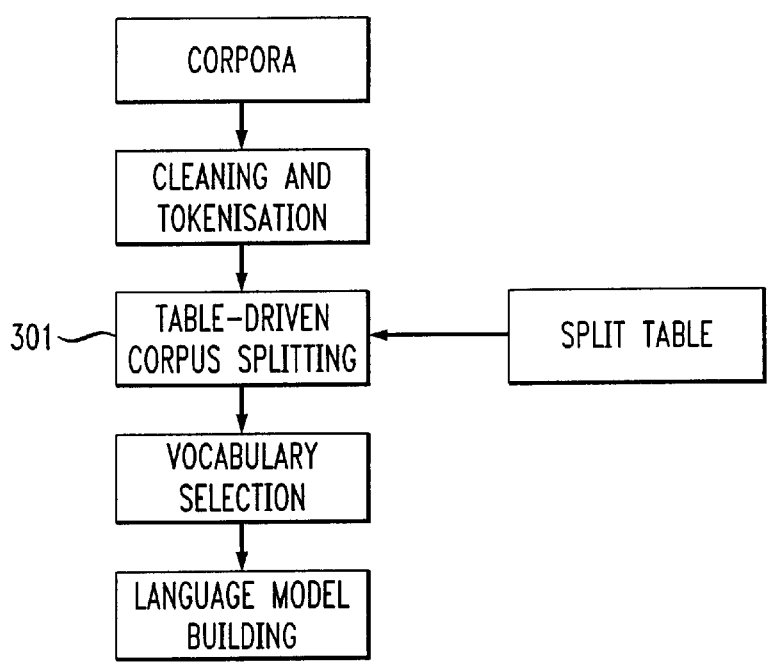

To handle the constituents according to the split-table (comprising a mixture of legal words and actual constituents) the current invention suggests to introduce a further step (301) before the selection of the vocabulary as shown in FIG. 3. Within this new step (301), the splitting information for the words into pieces is applied to the corpora. The new corpora are then used to select the vocabulary of pieces. In this case, the vocabulary will be the top N pieces. Therefore, as the vocabulary consists of legal words and constituents the LM actually is computed based on the sequence statistics of words as well as mixtures of words and constituents (depending on the nature of constituents as defined within the split-table).

4.2.3 The Split-Table for a Given Language

The process of getting the split-table is very much dependent on the nature of each language and how its derivatives are formed. If English is chosen as an example (although it is not a highly inflected language), a logical suffix set might be {s,ed,ing,er,ers,ly, ... } and a prefix set might be {ab, un, re, pre, ... } (this has to be understood as an example only). However, the current invention goes beyond this. The prefixes/suffixes are not necessarily a linguistic or phonetic known unit of the language but should be chosen to achieve maximum compression ratio of the selected vocabulary (pieces) compared to the number of real valid words that can be generated during recognition, i.e., the current teaching allows to use those constituents resulting in a maximum of compression of the vocabulary. But the prefixes and suffixes set can also be chosen to contain (any) part of compound words or even syllables. In the following example, the split-table is obtained by hand. However, in general, one could use clustering techniques to obtain the table using as starting points e.g., linguistic motivated pieces.

For example, if we choose prefix set as {c,m,h} and suffix set {s,ed,ing,er,ers} for cores like (at, all, work, use), the words of FIG. 4 can be generated.

In the above example, 3 prefixes+4 cores+5 suffixes which will occupy 12 vocabulary entries in a recognition system will be able to generate 23 valid English words. This proves the compression of a vocabulary achievable by the current invention. On the other hand, this advantage gives freedom to introduce additional words and constituents to the vocabulary not covered so far and thus increases the spectrum of words recognizable by the speech recognition system.

The following benefits are achievable by the current teaching:

1. Compression of the vocabulary The invention allows to define and store N words but generate and recognize up to M×N words (where M is language dependent).
2. Smaller vocabularies allow in addition a better estimation of the word (or piece) probabilities (uni-, bi-, tri-grams) within their context environment as more occurrences are seen in the respective corpora.
3. Efficient storing via mapping the N words into a set of groups having the same prefix/suffix pattern. Such approach ensures logical completeness and coverage of the chosen vocabulary. Usually the user who dictates a word defined in the vocabulary expects that all derived forms are also available. For example, one does not expect that the word 'use' is in the vocabulary while 'user' is not.
4. Flexibility of defining the prefix and suffix sets for each language to achieve the best compression. The prefix/suffix is not necessarily a linguistic or phonetic known unit of the language. In the above English example, the prefix set {c,m,h} does not have a linguistic or phonetic definition but has been found to give good compression ratio (maximize M) for this set of words.

It is very important to point out that the suffix (or prefix) set can be NULL and therefore a prefix set and a core set can generate the words. Also, the prefix set can be NULL and in this case a suffix set and a core set can generate the words. Actually any type of constituent being part of the segmented vocabulary can be combined with one another to reconstruct legal words of the language.

To illustrate, with an example for the Arabic language, the Arabic word 'wasayaktubuunahaa' ("and they will write it") can be segmented as follows 'wasaya+ktub+uunahaa' (wasaya: "and will", ktub: "write", uunahaa: "they it"). The core is 'ktub' to which are attached the prefixes 'wa' ("and"), sa (future tense), ya (3rd person), and the suffixes 'uuna' (masc. pl.) and 'haa' ("it"). The Arabic word 'wasayaktubuunahaa' maps to a complete English sentence: "and they" ((masc.) pl.) "will write it". Arabic is normally written without short vowels and other diacritics that mark gemination, zero vowel, and various inflectional case endings. The word in the above example is normally written 'wsyktbuunhaa'.

Similar segmentations in prefix-core-suffix parts can be applied in languages like German, Czech or Russian or of course any other (highly inflected) language.

4.2.4 The Text Post-Processor

Figure 5:
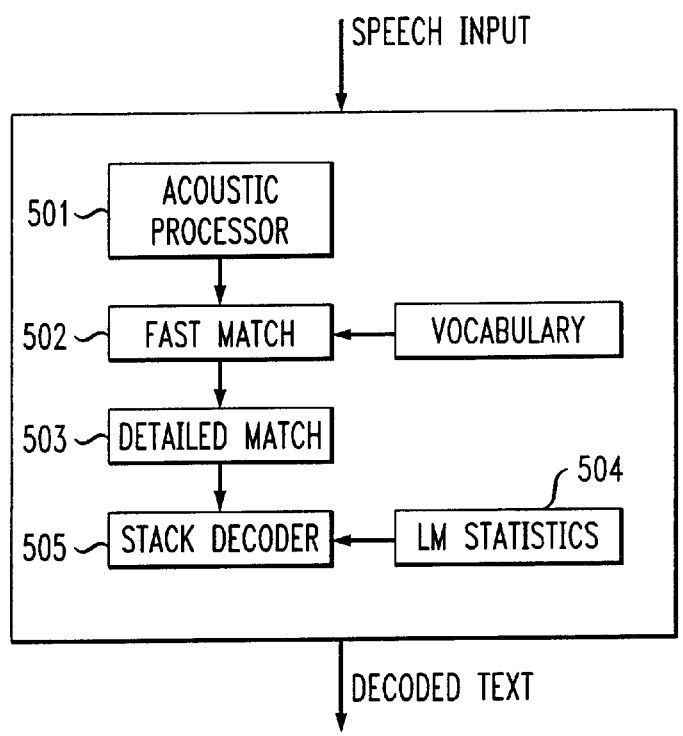
FIG. 5 is a block diagram reflecting the structure of a state of the art decoder of a speech recognizer.

FIG. 5 shows a block diagram of a traditional speech recognizer. The speech signal is first processed by the acoustic processor (501) where digital signal processing features (like energy, cepstrum, . . . ) are extracted. A fast match (502) technique is implemented to determine a short list of candidate words quickly before performing expensive detailed match (503). The LM (504) is then consulted to determine (505) the corresponding sequence of words. Thus, the detailed match technique is applied to promising candidate words only.

In case the vocabulary consists of legal words and/or constituents (or "pieces", i.e., prefixes, cores, suffixes) of legal words or mixtures thereof a post processing step (606) is required as visualized in FIG. 6 to concatenate those pieces and display them to the user as valid words. In this invention, a "core-tag table" is generated automatically from the split table. First the split table is sorted by cores and then cores are grouped according to the prefix/suffix set that can be attached thereto. A "prefix (suffix) tag" is just a number given to each prefix (suffix). Also a "core-prefix matrix" is formed where the element (core_no,prefix_no) denotes if this is a valid concatenation (1) or not (0). Another "prefix-prefix matrix" is also formed for validating the concatenation of two prefixes.

A specific implementation of the current invention relates to an Arabic speech recognition system based on the IBM ViaVoice Gold engine (where the limitation of 64 k pronunciations still existed). This implementation was built using the 2-pieces segmentation technique as described above.

A 32 k words vocabulary (to be more precise: according to the current invention the entries within the vocabulary comprise a mixture/collection of prefixes and cores and complete legal words of the language) is used to build the LM and the 3-gram counts are collected on the 2-pieces segmented corpora.

The possible pronunciations of each word are collected to build the baseform pool (needed to tell the recognizer how words are pronounced). The baseform pool contains 60 k baseforms with an average of 2 pronunciations of each word.

Automatically, a "core-tag table" is obtained from the split-table where the 32 k words are classified into 380 groups. A core-tag table is a table relating the cores, defined according to the split-table, to a certain range of natural numbers serving unique as indexes for quickly identifying a certain core via its index. It is for instance of the structure: Word=Tag_000, . . . Word=Tag_380. Along the same lines, a prefix-tag table has been generated assigning another range of natural numbers, serving as unique indexes for the prefixes, to the prefixes. It is for instance of the structure: Prefix=Tag_400, . . . Prefix=Tag_500.

As one of the representatives of the constituent combination tables, a "core-prefix matrix" of 380×100 entries has been formed of 1's (valid prefixes) and 0's (not valid) to be used during recognition to stop non-valid combinations from appearing on the screen. FIG. 7 gives an example of a core-prefix matrix visualizing the row indexes (000–380) as representations of the cores and the column indexes (001–100) as representations of the prefixes while the cells indicate the (in)validity of the specific prefix/core recombination via 0 and 1. Another representative of the constituent combination tables is the "prefix-prefix matrix" of 100×100 entries also visualized in FIG. 7. It indicates by 1's (valid prefixes) and 0's (not valid) to be used during recognition to stop non-valid combinations from appearing on the screen recombining two prefixes into a valid third prefix. As also apparent from FIG. 7 with respect to the prefix-prefix matrix, the row indexes (00–100) and the column indexes (001–100) are the representations of the two prefixes while the cells indicate the (in)validity of the specific prefix/prefix recombination via 0 and 1 into a third prefix.

For this specific implementation of the invention, the exploitation of the core-prefix matrix and the prefix-prefix-matrix during the execution of the post-processor (606) is discussed.

After a constituent is recognized by the speech recognizer, it is processed according to the following logic, which is also visualized by the flow-diagram of FIG. 8:

1 If the piece/constituent has a tag in the range from 400–500 (which identifies it as a prefix), subtract 400 to get the PREFIX_NO1 (801, 802)
2 Get the next piece from the recognizer and check:
  2.1 If it is a core, get the tag which gives the GROUP_NO (808). Check element (GROUP_NO, PREFIX_NO1) of the core-prefix matrix (809):
    2.1.1 If 1, concatenate the prefix and the core and display (810)
    2.1.2 If 0, replace the prefix with a valid prefix, concatenate with the core and display. As one possibility said valid prefix might be determined from an "alternative-list" for that prefix. For each recognized word (here a prefix) the decoder could send the best hypothesis as well as the next close matching words. This list could be used as alternative-list to improve the recombination of pieces to words.
  2.2 If it is a second prefix, get the PREFIX_NO2 (804), check the prefix-prefix matrix element (PREFIX_NO1, PREFIX_NO2) (805)
    2.2.1 If 1, change PREFIX_NO1 to new PREFIX_NO which corresponds to the concatenation of the two prefixes and clear PREFIX_NO2. Get next piece and repeat at step 1 (806)
    2.2.2 If 0, copy PREFIX_NO2 to PREFIX_NO1, clear PREFIX_NO2. Get next piece and repeat at step 1 (807)

Based on these embodiments, the engine sends the correct prefix sub-word combination in 95% of the cases.

Above teaching outlined with respect to recombination of prefix with prefix as well as prefix with core can be generalized to recombination of any two constituents. Of course, the recombination process operates recursively on creating recombined constituents. For example, two consecutive constituents representing a first prefix-constituent and a second prefix-constituent may be recombining a third prefix-constituent based upon a prefix-prefix-matrix indicating a legal combination in said language, or two consecutive constituents representing a prefix-constituent and a core-constituent may be recombined into a second core-constituent based upon core-prefix-matrix indicating a legal combination in said language, or two consecutive constituents representing a prefix-constituent and a suffix-constituent may be recombined into a second prefix-constituent based upon a prefix-suffix-matrix indicating a legal combination in said language, or two consecutive constituents representing a core-constituent and a suffix-constituent may be recombined into a second core-constituent based upon a core-suffix-matrix indicating a legal combination in said language.

As standard behavior for handling of any two constituents for which the corresponding constituent combination table indicates an illegal combination, the two constituents are not recombined and said constituents are treated as separate entries in said language.

Moreover, the above example uses matrix technology for implementing the various constituent combination tables. Further improvements may be achieved using sparse-matrix technology for implementing the matrixes.

4.2.5 The Coverage of Legal Words of a Language by the Approach of Segmented Vocabularies In the following, the efficiency of the current teaching of segmented vocabularies to increase the coverage of a certain language and decrease the size of the vocabulary at the same time is demonstrated. This is done on the basis of the Arabic language. A comparison is given based on vocabulary size and language coverage according to the state of the art which then is compared to the segmentation approach of vocabularies according to the current teaching.

The state of the art situation is compared to a segmentation approach using 2 constituents, prefix and core, with a corresponding split-table and a core-prefix-matrix.

In addition, this situation is compared to a segmentation approach using up to 3 constituents, prefix, core and suffix. The Arabic words are treated as having two or three elements: prefix-core or prefix-core-suffix.

The 3-constituent vocabulary has been set up with 100 prefixes, 200 suffixes and 29000 cores. The 2-constituent vocabulary was formed by concatenating the core and the following suffix of the 3-constituent vocabulary to form a new core, it contains 100 prefixes and 604 k cores. Thus the 3-constituent vocabulary was originally of prefix-core-suffix structure and has been transformed into a 2-constituent vocabulary.

A corpus of 100M words (journalism, business correspondence and encyclopedia) has been used to test the coverage and to build the LM.

To show efficiency of the underlying idea of segmentation vocabularies the following steps have been performed:

1. The unique words constituting the corpora are collected.
2. The segmentation experience is reflected into corpora to form a new segmented one.
3. The coverage versus number of words in the segmented vocabulary has been computed.

As the result, by segmentation of the original words into 2 pieces or 3 pieces, coverage has been significantly increased compared to an unsegmented vocabulary of equal size. The following table shows how 30 k constituents (from a 3 pieces segmentation) achieve 99% coverage and 32 k constituents (from a 2 pieces segmentation) achieve 97% whereas 200 k and 115 k original words (non-segmented) are required respectively to achieve the same coverage.

| | Number of Words | | |
|---|---|---|---|
| Coverage | Before Segmentation — Original Words | After Segmentation — 2 Constituents | After Segmentation — 3 Constituents |
| 99% | 200 K | 46 K | 30 K |
| 97% | 115 K | 32 K | no need |
| 93% | 46 K | no need | no need |

5 Acronyms
LM Language Model

What is claimed is:

1. A speech recognition system for recognition of spoken speech of a language, the speech recognition system comprising:

a vocabulary including a multitude of words of said language recognizable by said speech recognition system, the vocabulary comprising entries identical to legal words of said language and entries that are constituents of legal words of said language, said constituents being arbitrary sub-components of said legal words according to their orthography, wherein said constituents are selected to achieve a compression of said vocabulary, wherein said vocabulary defines legal words of said language recognizable by said speech recognition system either by an entry itself, or by legal recombination of up to S entries in combination representing a legal word of said language; and a constituent-combination-table indicating which concatenations of said constituents are legal concatenations in said language;

wherein said constituent-combination-table comprises, in the case of S =2 or S =3, at least one of:

a core-prefix-matrix indicating whether a combination of a prefix-constituent and a core-constituent is a legal combination in said language or not;

a prefix-suffix-matrix indicating whether a combination of a prefix-constituent and a suffix-constituent is a legal combination in said language or not; and a prefix-prefix-matrix indicating whether a combination of a first-prefix-constituent and a second-prefix-constituent is a legal combination in said language building a third-prefix-constituent or not.

2. A speech recognition system according to claim 1, wherein S is 2 or 3.

3. A speech recognition system according to claim 2, wherein said vocabulary comprises, if S is 2, constituents allowing for recombination of legal words from a prefix-constituent and a core-constituent, or from a core-constituent and a suffix-constituent, or from a prefix-constituent and a suffix-constituent and further wherein said vocabulary comprises, if S is 3, constituents allowing for recombination of legal words from a prefix-constituent, a core-constituent and a suffix-constituent.

4. A speech recognition system according to claim 1, further wherein for at least one of said core-prefix-matrix, said prefix-suffix-matrix, said prefix-prefix-matrix, said core-constituents, said prefix-constituents and said suffix-constituents are assigned unique numbers forming the indexes of said matrixes.

5. A speech recognition system according to claim 4, further comprising a post-processor responsive to an input comprising recognized constituents of said vocabulary for recombination of said constituents into legal words of said language exploiting said constituent-combination-table.

6. A speech recognition system according to claim 5, further wherein said post-processor is at least one of:

(a) responsive to two consecutive constituents representing a first prefix-constituent and a second prefix-constituent by one of:

recombining said first prefix-constituent and said second prefix-constituent into a third prefix-constituent if said prefix-prefix-matrix is indicating said first prefix-constituent and said second prefix-constituent as a legal combination in said language, and dropping said first prefix-constituent if said prefix-prefix-matrix is indicating said first prefix-constituent and said second prefix-constituent as an illegal combination in said language;

(b) responsive to two consecutive constituents representing a prefix-constituent and a core-constituent by one of:

recombining said prefix-constituent and said core-constituent into a second core-constituent if said core-prefix-matrix is indicating said prefix-constituent and said core-constituent as a legal combination in said language, and if said core-prefix-matrix is indicating said prefix-constituent and said core-constituent as an illegal combination in said language, by replacing said prefix-constituent with an alternative prefix-constituent and recombining said alternative prefix-constituent and said core-constituent if said core-prefix-matrix is indicating said alternative prefix-constituent and said core-constituent as a legal combination in said language; and (c) responsive to two consecutive constituents representing a prefix-constituent and a suffix-constituent by:
recombining said prefix-constituent and said suffix-constituent into a second prefix-constituent if said prefix-suffix-matrix is indicating said prefix-constituent and said suffix-constituent as a legal combination in said language.

7. A speech recognition system according to claim 6, further comprising at least one of the step of:
not recombining said prefix-constituent and said suffix-constituent and treating said prefix-constituent as a separate entry if said prefix-suffix-matrix is indicating said prefix-constituent and said suffix-constituent as an illegal combination in said language.

8. A speech recognition system according to claim 6, further wherein said alternative prefix-constituent is retrieved from an alternative-list, said alternative-list comprising alternative prefix-constituents to said prefix-constituents in decreasing matching probability.

9. A speech recognition system according to claim 1, further comprising a language-model of said language being computed based on the N-gram frequencies of a sequence of N entries of said vocabulary.

10. A speech recognition system according to claim 1, wherein phones are used as smallest recognition units.

11. A method for use with a speech recognition system for recognition of spoken speech of a language, said method using a vocabulary including a multitude of words of said language recognizable by said speech recognition system, said method comprising the steps of:
identifying, in said spoken speech, entries of said vocabulary wherein the entries of said vocabulary comprise entries identical to legal words of said language and entries that are constituents of legal words of said language, said constituents being arbitrary sub-components of said legal words according to their orthography, wherein said constituents are selected to achieve a compression of said vocabulary; and
post-processing an input comprising recognized constituents of said vocabulary for recombination of said constituents into legal words, said post-processing-step recombining up to S constituents if a constituent-combination-table indicates that said recognized constituents are a legal concatenation in said language;
wherein the post-processing step further comprises at least one of;
(a) recombining two consecutive constituents representing a first-prefix-constituent and a second-prefix-constituent by one of:
recombining said first prefix-constituent and said second prefix-constituent into a third prefix-constituent if a prefix-prefix-matrix is indicating said first prefix-constituent and said second prefix-constituent as a legal combination in said language, and
dropping said first prefix-constituent if said prefix-prefix-matrix indicating said first prefix-constituent and said second prefix-constituent as an illegal combination in said language;

(b) recombining two consecutive constituents representing a prefix-constituent and a core-constituent by one of:
recombining said prefix-constituent and said core-constituent into a second core-constituent if a core-prefix-matrix is indicating said prefix-constituent and said core-constituent as a legal combination in said language, and
if said core-prefix-matrix is indicating said prefix-constituent and said core-constituent as an illegal combination in said language, replacing said prefix-constituent with an alternative prefix-constituent and recombining said alternative prefix-constituent and said core-constituent if said core-prefix-matrix is indicating said alternative prefix-constituent and said core-constituent as a legal combination in said language; and (c) recombining two consecutive constituents representing a prefix-constituent and a suffix-constituent by recombining said prefix-constituent and said suffix-constituent into a second prefix-constituent if a prefix-suffix-matrix is indicating said prefix-constituent and said suffix-constituent as a legal combination in said language.

12. A method according to claim 11, wherein S is 2 or 3.

13. A method according to claim 12, wherein the post-processing step further comprises:
recombining, if S is 2, legal words from a prefix-constituent and a core-constituent, or from a core-constituent and a suffix-constituent, or from a prefix-constituent and a suffix-constituent, and recombining, if S is 3, legal words from a prefix-constituent, a core-constituent and a suffix-constituent.

14. A method according to claim 11, further comprising:
not recombining said prefix-constituent and said suffix-constituent and treating said prefix-constituent as a separate entry if said prefix-suffix-matrix is indicating said prefix-constituent and said suffix-constituent as an illegal combination in said language.

15. A method according to claim 11, wherein said alternative prefix-constituent is retrieved from an alternative-list, said alternative-list comprising alternative prefix-constituents to said prefix-constituents in decreasing matching probability.

16. A method according to claim 11, wherein the post-processing step further comprises:
assigning said core-constituents, said prefix-constituents and said suffix-constituents unique numbers used as indexes of said core-prefix-matrix and/or said prefix-suffix-matrix and/or said prefix-prefix-matrix.

17. A method according claim 11, further comprising the step of using a language-model of said language being based on the N-gram frequencies of a sequence of N entries of said vocabulary.

18. An article of manufacture for use with a speech recognition system for recognition of spoken speech of a language, said article of manufacture using a vocabulary including a multitude of words of said language recognizable by said speech recognition system, the article of manufacture comprising a machine readable medium containing one or more programs which when executed implement the step of:
identifying, in said spoken speech, entries of said vocabulary wherein the entries of said vocabulary comprise entries identical to legal words of said language and entries that are constituents of legal words of said language, said constituents being arbitrary subcomponents of said legal words according to their orthography, wherein said constituents are selected to achieve a compression of said vocabulary; and post-processing an input comprising recognized constituents of said vocabulary for recombination of said constituents into legal words, said post-processing-step recombining up to S constituents if a constituent-combination-table indicates that said recognized constituents are a legal concatenation in said language;

wherein the post-processing step further comprises at least one of:

(a) recombining two consecutive constituents representing a first-prefix-constituent and a second-prefix-constituent by one of:

recombining said first prefix-constituent and said second prefix-constituent into a third prefix-constituent if a prefix-prefix-matrix is indicating said first prefix-constituent and said second prefix-constituent as a legal combination in said language, and dropping said first prefix-constituent if said prefix-prefix-matrix indicating said first prefix-constituent and said second prefix-constituent as an illegal combination in said language;

(b) recombining two consecutive constituents representing a prefix-constituent and a core-constituent by one of:

recombining said prefix-constituent and said core-constituent into a second core-constituent if a core-prefix-matrix is indicating said prefix-constituent and said core-constituent as a legal combination in said language, and if said core-prefix-matrix is indicating said prefix-constituent and said core-constituent as an illegal combination in said language, replacing said prefix-constituent with an alternative prefix-constituent and recombining said alternative prefix-constituent and said core-constituent if said core-prefix-matrix is indicating said alternative prefix-constituent and said core-constituent as a legal combination in said language; and (c) recombining two consecutive constituents representing a prefix-constituent and a suffix-constituent by recombining said prefix-constituent and said suffix-constituent into a second prefix-constituent if a prefix-suffix-matrix is indicating said prefix-constituent and said suffix-constituent as a legal combination in said language.

19. A speech recognition system for recognizing spoken speech of a language, the speech recognition system comprising:

a vocabulary including a multitude of words of said language recognizable by said speech recognition system, the vocabulary comprising a multitude of entries wherein said multitude of entries comprises entries identical to legal words of said language and entries that are constituents of legal words of said language, said constituents being arbitrary subcomponents of said legal words according to its orthography; wherein said vocabulary defines legal words of said language recognizable by said speech recognition system either by an entry itself, or by legal recombination of up to S entries in combination representing a legal word of said language;

a constituent-combination table indicating which concatenations of said legal constituents are legal concatenations in said language; wherein said constituent-combination table comprises, in the case of S=2 or S=3, at least one of:

a core-prefix-matrix indicating whether a combination of a prefix-constituent and a core-constituent is a legal combination in said language or not;

a prefix-suffix-matrix indicating whether a combination of a prefix-constituent and a suffix-constituent is a legal combination in said language or not; and a prefix-prefix-matrix indicating whether a combination of a first prefix-constituent and a second prefix-constituent is a legal combination in said language building a third prefix-constituent or not;

wherein for at least one of said core-prefix-matrix, said prefix-suffix-matrix, said prefix-prefix-matrix, said core-constituents, said prefix-constituents and said suffix-constituents are represented by unique numbers forming indexes of said matrices; and a post-processor responsive to an input comprising recognized constituents of said vocabulary for recombination of said constituents into legal words of said language exploiting said constituent-combination table; wherein said post-processor is at least one of:

(a) responsive to two consecutive constituents representing a first prefix-constituent and a second prefix-constituent by one of:

recombining said first prefix-constituent and said second prefix-constituent into a third prefix-constituent if said prefix-prefix-matrix is indicating said first prefix-constituent and said second prefix-constituent as a legal combination in said language, and dropping said first prefix-constituent if said prefix-prefix-matrix is indicating said first prefix-constituent and said second prefix-constituent as an illegal combination in said language;

(b) responsive to two consecutive constituents representing a prefix-constituent and a core-constituent by one of:

recombining said prefix-constituent and said core-constituent into a second core-constituent if said core-prefix-matrix is indicating said prefix-constituent and said core-constituent as a legal combination in said language, and if said core-prefix-matrix is indicating said prefix-constituent and said core-constituent as an illegal combination in said language, replacing said prefix-constituent with an alternative prefix-constituent and recombining said alternative prefix-constituent and said core-constituent if said core-prefix-matrix is indicating said alternative prefix-constituent and said core-constituent as a legal combination in said language; and (c) responsive to two consecutive constituents representing a prefix-constituent and a suffix-constituent by:

recombining said prefix-constituent and said suffix-constituent into a second prefix-constituent if said prefix-suffix-matrix is indicating said prefix-constituent and said suffix-constituent as a legal combination in said language.

* * * * *